United States Patent
Pezeshki et al.

(10) Patent No.: US 12,074,675 B2
(45) Date of Patent: Aug. 27, 2024

(54) SUPPORT SIGNALING FOR BEAM STRENGTH PREDICTION

(71) Applicant: QUALCOMM Incorporated, San Diego, CA (US)

(72) Inventors: Hamed Pezeshki, San Diego, CA (US); Tao Luo, San Diego, CA (US); Arumugam Chendamarai Kannan, San Diego, CA (US); Philip Aaron Sisk, San Diego, CA (US); Taesang Yoo, San Diego, CA (US); Mahmoud Taherzadeh Boroujeni, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 400 days.

(21) Appl. No.: 17/404,792

(22) Filed: Aug. 17, 2021

(65) Prior Publication Data

US 2023/0054081 A1 Feb. 23, 2023

(51) Int. Cl.
H04B 7/06 (2006.01)
H04B 17/318 (2015.01)

(52) U.S. Cl.
CPC ......... *H04B 7/0632* (2013.01); *H04B 17/318* (2015.01); *H04B 7/0617* (2013.01)

(58) Field of Classification Search
CPC ............... H04B 7/0632; H04B 7/0617; H04B 17/318
See application file for complete search history.

(56) References Cited

U.S. PATENT DOCUMENTS

| | | | | |
|---|---|---|---|---|
| 2020/0186227 A1* | 6/2020 | Reider | ............... | H04B 7/0695 |
| 2021/0167875 A1* | 6/2021 | Shen | .................. | H04B 7/0695 |
| 2021/0243660 A1* | 8/2021 | Xie | ................... | H04W 36/30 |
| 2021/0351885 A1* | 11/2021 | Chavva | ............... | H04B 7/0626 |
| 2022/0014933 A1* | 1/2022 | Moon | ................ | H04W 16/225 |
| 2022/0369122 A1* | 11/2022 | Enescu | ................ | H04W 4/029 |
| 2023/0044727 A1* | 2/2023 | Pantelidou | ............ | G06N 5/04 |
| 2023/0053589 A1 | 2/2023 | Pezeshki et al. | | |
| 2023/0155660 A1* | 5/2023 | Zhang | ................ | H04B 7/0404 375/267 |
| 2023/0196111 A1* | 6/2023 | Alabbasi | ............... | H04W 16/18 455/414.1 |
| 2023/0198640 A1* | 6/2023 | Kovács | .................. | H04B 17/26 370/252 |
| 2023/0269612 A1* | 8/2023 | Muruganathan | ...... | H04L 1/0027 370/252 |
| 2023/0337269 A1* | 10/2023 | Rao | ..................... | H04W 72/542 |

FOREIGN PATENT DOCUMENTS

WO WO-2020167196 A1 * 8/2020

* cited by examiner

*Primary Examiner* — Mohammad S Adhami
(74) *Attorney, Agent, or Firm* — Patterson + Sheridan, LLP

(57) ABSTRACT

Certain aspects of the present disclosure provide techniques for wireless communication by a base station (BS). In some examples, the techniques include receiving, from a user equipment (UE), one or more indications of one or more actual beam strengths as measured at the UE at one or more time periods for one or more transmit beams of the BS. In some examples, the techniques include receiving, from the UE, assistance information regarding the one or more actual beam strengths.

30 Claims, 8 Drawing Sheets

```
                    ┌─────────────────────────────────────┐
                    │  A METHOD FOR BEAM STRENGTH PREDICTION │
                    └─────────────────────────────────────┘
                                    │
                                    ▼                         ─ 510
┌──────────────────────────────────────────────────────────────┐
│ RECEIVING, FROM A USER EQUIPMENT (UE), ONE OR MORE           │
│ INDICATIONS OF ONE OR MORE ACTUAL BEAM STRENGTHS AS          │
│ MEASURED AT THE UE AT ONE OR MORE TIME PERIODS FOR ONE OR    │
│ MORE TRANSMIT BEAMS OF THE BS                                │
└──────────────────────────────────────────────────────────────┘
                                    │
                                    ▼                         ─ 520
┌──────────────────────────────────────────────────────────────┐
│ RECEIVING, FROM THE UE, ASSISTANCE INFORMATION REGARDING     │
│ THE ONE OR MORE ACTUAL BEAM STRENGTHS                        │
└──────────────────────────────────────────────────────────────┘
                                    │
                                    ▼                         ─ 530
┌──────────────────────────────────────────────────────────────┐
│ DETERMINING A PREDICTED BEAM STRENGTH FOR AT LEAST ONE       │
│ TRANSMIT BEAM OF THE BS FOR A TIME PERIOD SUBSEQUENT TO THE  │
│ ONE OR MORE TIME PERIODS BASED AT LEAST ON THE ONE OR MORE   │
│ INDICATIONS AND THE ASSISTANCE INFORMATION                   │
└──────────────────────────────────────────────────────────────┘
```

A METHOD FOR SUPPORTING BEAM STRENGTH PREDICTION

610

TRANSMITTING, TO A BASE STATION (BS), ONE OR MORE INDICATIONS OF ONE OR MORE ACTUAL BEAM STRENGTHS AS MEASURED AT THE UE AT ONE OR MORE TIME PERIODS FOR ONE OR MORE TRANSMIT BEAMS OF THE BS

620

TRANSMITTING, TO THE BS, ASSISTANCE INFORMATION REGARDING THE ONE OR MORE ACTUAL BEAM STRENGTHS

*FIG. 6*

SUPPORT SIGNALING FOR BEAM STRENGTH PREDICTION

INTRODUCTION

Aspects of the present disclosure relate to wireless communications, and more particularly, to techniques related to beamforming.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

One aspect provides a user equipment (UE) comprising a memory and a processor coupled to the memory. In certain aspects, the memory and the processor are configured to transmit, to a base station (BS), one or more indications of one or more actual beam strengths as measured by the UE at one or more time periods for one or more transmit beams of the BS. In certain aspects, the memory and the processor are configured to transmit, to the BS, assistance information regarding the one or more actual beam strengths.

One aspect provides a base station (BS) comprising a memory and a processor coupled to the memory. In certain aspects, the memory and the processor are configured to receive, from a user equipment (UE), one or more indications of one or more actual beam strengths as measured at the UE at one or more time periods for one or more transmit beams of the BS. In certain aspects, the memory and the processor are configured to receive, from the UE, assistance information regarding the one or more actual beam strengths.

One aspect provides a method of wireless communication by a user equipment (UE). In certain aspects, the method comprises transmitting, to a base station (BS), one or more indications of one or more actual beam strengths as measured by the UE at one or more time periods for one or more transmit beams of the BS. In certain aspects, the method comprises transmitting, to the BS, assistance information regarding the one or more actual beam strengths.

One aspect provides a method of wireless communication by a base station (BS). In certain aspects, the method comprises receiving, from a user equipment (UE), one or more indications of one or more actual beam strengths as measured at the UE at one or more time periods for one or more transmit beams of the BS. In certain aspects, the method comprises receiving, from the UE, assistance information regarding the one or more actual beam strengths.

One aspect provides a user equipment (UE). In certain aspects, the UE comprises means for transmitting, to a base station (BS), one or more indications of one or more actual beam strengths as measured by the UE at one or more time periods for one or more transmit beams of the BS. In certain aspects, the UE comprises means for transmitting, to the BS, assistance information regarding the one or more actual beam strengths.

One aspect provides a base station (BS). In certain aspects, the BS comprises means for receiving, from a user equipment (UE), one or more indications of one or more actual beam strengths as measured at the UE at one or more time periods for one or more transmit beams of the BS. In certain aspects, the BS comprises means for receiving, from the UE, assistance information regarding the one or more actual beam strengths.

One aspect provides a non-transitory computer-readable medium having instructions stored thereon that, when executed by a user equipment (UE), cause the UE to perform operations. In certain aspects, the operations comprise transmitting, to a base station (BS), one or more indications of one or more actual beam strengths as measured by the UE at one or more time periods for one or more transmit beams of the BS. In certain aspects, the operations comprise transmitting, to the BS, assistance information regarding the one or more actual beam strengths.

One aspect provides non-transitory computer-readable medium having instructions stored thereon that, when executed by a base station (BS), cause the BS to perform operations. In certain aspects, the operations comprise receiving, from a user equipment (UE), one or more indications of one or more actual beam strengths as measured at the UE at one or more time periods for one or more transmit beams of the BS. In certain aspects, the operations comprise receiving, from the UE, assistance information regarding the one or more actual beam strengths.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIG. 5 is a flow diagram illustrating example operations for wireless communication by a BS.

FIG. 6 is a flow diagram illustrating example operations for wireless communication by a UE.

DETAILED DESCRIPTION

Figure 1:
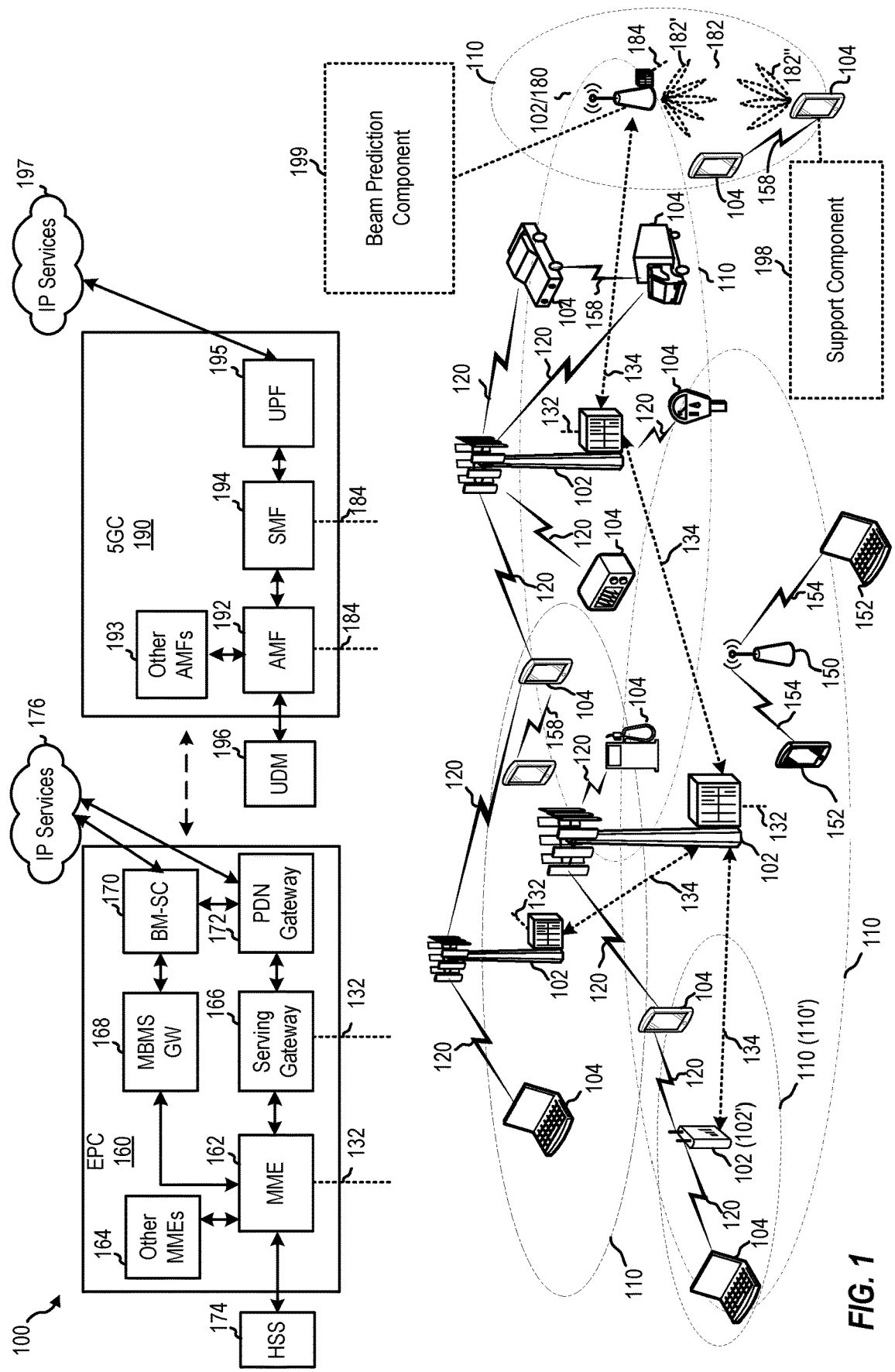
FIG. 1 is a block diagram conceptually illustrating an example wireless communication network.

Aspects of the present disclosure provide apparatuses, methods, processing systems, and computer-readable mediums for predicting, at a base station (BS), a beam strength of a transmit beam of the BS as received by a user equipment (UE).

In wireless communication between two nodes (e.g., a user equipment (UE) and a base station (BS)), each node may be capable of using beamforming for transmission and/or reception of wireless signals. In particular, each node may be capable of, at any given time, using one or more of multiple directional transmit beams for transmission of signals and/or using one or more of multiple directional receive beams for reception of signals to support a robust communication link between the two nodes. For example, a BS may transmit downlink signaling to one or more UEs over multiple transmit beams, wherein each of the multiple transmit beams is pointed in a direction that is different relative to other of the multiple transmit beams. The use of multiple transmit beams enables a wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase a data rate or to multiple UEs to increase an overall system capacity. However, such as due to mobility of a UE, the quality associated with one or more of the multiple transmit beams as received at the UE may change. For example, the UE may travel away from a direction of a transmit beam, or into an area with a physical obstruction with respect to the transmit beam. In some examples, one or more of the transmit beams used by the BS may experience a relatively high level of interference, or may be reflected or absorbed by a physical surface in-between the UE and the BS.

Aspects of the present disclosure provide techniques for a BS to actively predict a future strength, as would be measured by the UE, of one or more transmit beams used by the BS in a communication link with the UE. In certain aspects, the "strength" as measured at the UE for a particular transmit beam may refer to a reference signal received power (RSRP) as measured at the UE for a reference signal (RS) transmitted by the BS over the particular transmit beam. In an example, a prediction mechanism of the BS may be trained to predict what a UE will measure as strength of one or more BS transmit beams based at least in part on previous strength measurements made by the UE for the one or more BS transmit beams, and assistance information provided to the BS by the UE. For example, assistance information may include information indicative of a UE movement direction and/or speed, information indicative of a blocking event or other event that may reduce transmit beam reliability, and/or a measure of latency associated with a processing time for measuring a received power of a transmit beam.

By predicting the strength a UE will measure of a transmit beam used by the BS, the BS may determine if one or more transmit beams used by the BS will be blocked, or will no longer provide for viable communication with the UE in the future. Such an ability allows the BS to proactively switch a transmit beam currently serving the UE to another transmit beam in order to maintain future communications with the UE. By switching beams in such a proactive manner, the BS and UE may avoid performing lengthy beam recovery processes that interrupt communications.

Accordingly, certain aspects of the present disclosure provide techniques for a BS to predict transmit-beam strength measurements of a UE. In particular, certain aspects relate to a BS using historical beam measurements as well as assistance information provided to the BS by the UE, to train the prediction mechanism.

Introduction to Wireless Communication Networks

FIG. 1 depicts an example of a wireless communications system 100, in which aspects described herein may be implemented.

Generally, wireless communications system 100 includes base stations (BSs) 102, user equipment (UEs) 104, one or more core networks, such as an Evolved Packet Core (EPC) 160 and 5G Core (5GC) network 190, which interoperate to provide wireless communications services.

Base stations 102 may provide an access point to the EPC 160 and/or 5GC 190 for a user equipment 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

Base stations 102 wirelessly communicate with UEs 104 via communications links 120. Each of base stations 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between base stations 102 and UEs 104 may include uplink (UL) (also referred to as reverse link) transmissions from a user equipment 104 to a base station 102 and/or downlink (DL) (also referred to as forward link) transmissions from a base station 102 to a user equipment 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, base station 180 and the UE 104 may each include a plurality of antennas, such as antenna elements, antenna panels, and/or antenna arrays to facilitate the beamforming.

In some cases, base station 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may also receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same. Similarly, the transmit and receive directions for UE 104 may or may not be the same.

Wireless communication network 100 includes beam prediction component 199, which may be configured to allow the BS 102 to predict a transmit beam strength as measured by a UE 104. Wireless network 100 further includes support component 198, which may be used configured to provide the BS 102 with information to support transmit beam strength prediction.

Figure 2:
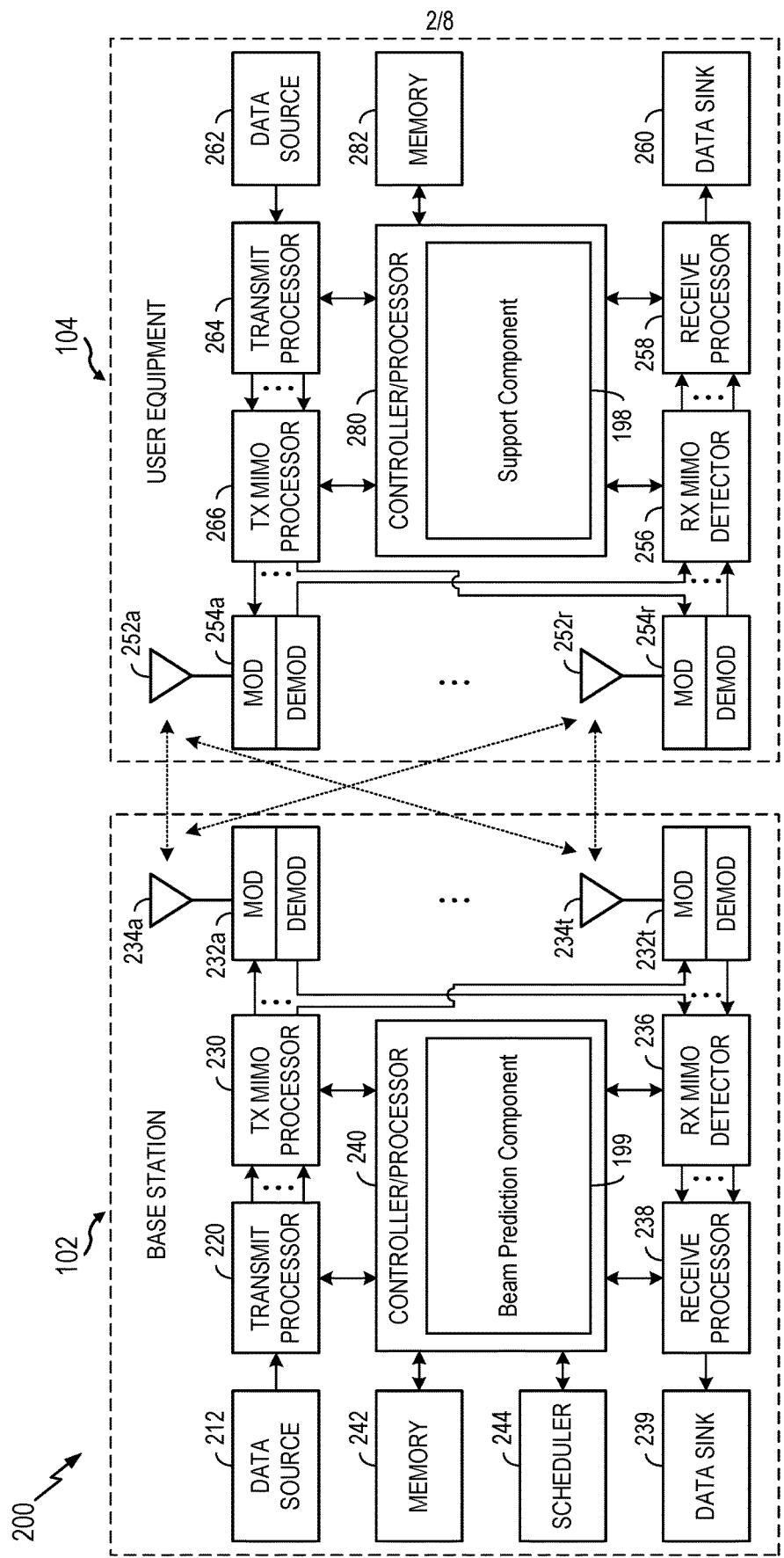
FIG. 2 is a block diagram conceptually illustrating aspects of an example of a base station (BS) and a user equipment (UE).

FIG. 2 depicts aspects of an example base station (BS) 102 and a user equipment (UE) 104.

Generally, base station 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., data source 212) and wireless reception of data (e.g., data sink 239). For example, base station 102 may send and receive data between itself and user equipment 104.

Base station 102 includes controller/processor 240, which may be configured to implement various functions related to wireless communications. In the depicted example, controller/processor 240 includes beam prediction component 199. Notably, while depicted as an aspect of controller/processor 240, beam prediction component 199 may be implemented additionally or alternatively in various other aspects of base station 102 in other implementations.

Generally, user equipment 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., data source 262) and wireless reception of data (e.g., data sink 260).

User equipment 104 includes controller/processor 280, which may be configured to implement various functions related to wireless communications. In the depicted example, controller/processor 280 includes support component 198. Notably, while depicted as an aspect of controller/processor 280, support component 198 may be implemented additionally or alternatively in various other aspects of user equipment 104 in other implementations.

Figure 3:
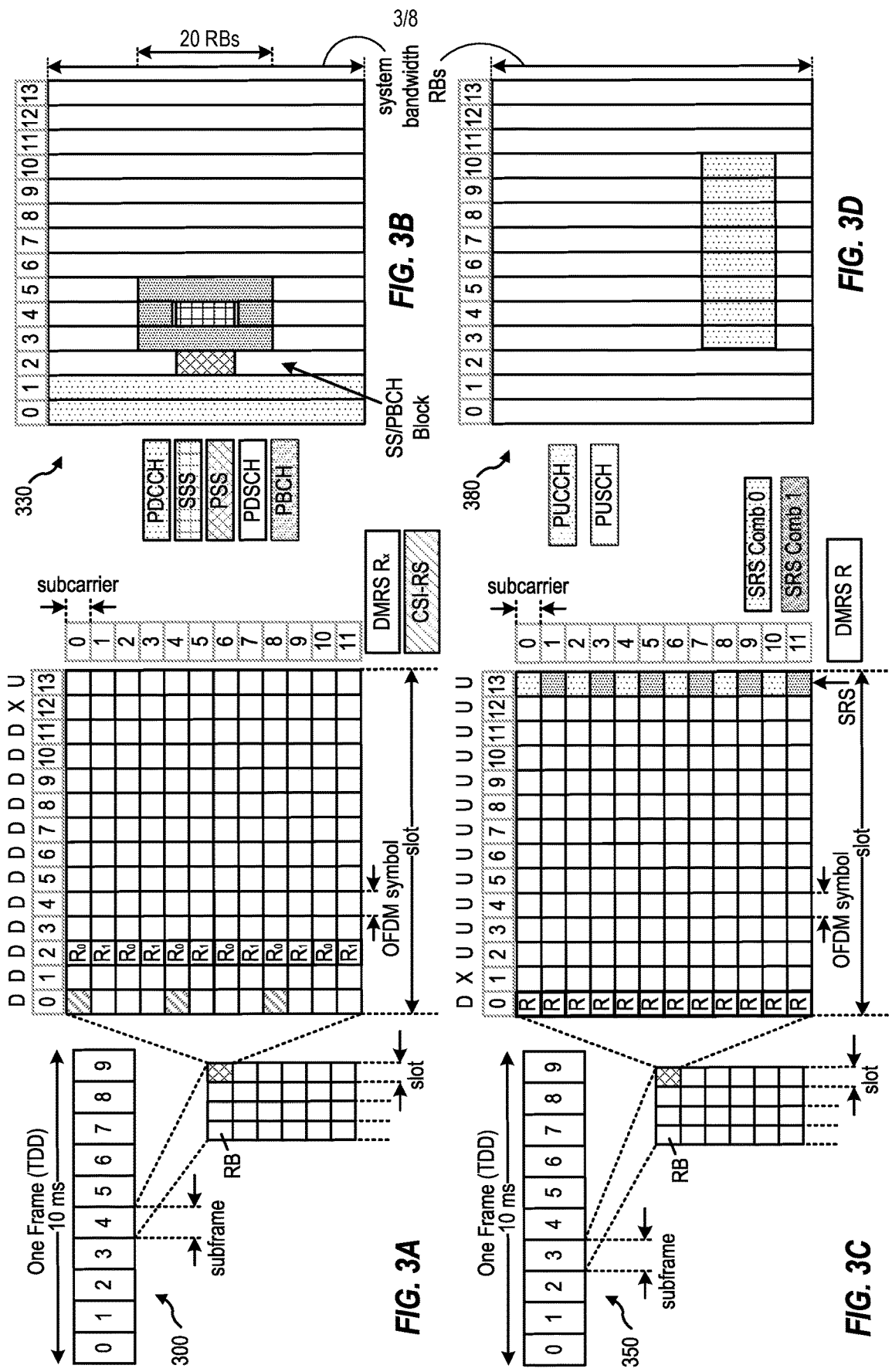
FIGS. 3A-3D are schematic diagrams illustrating various example aspects of data structures for a wireless communication network.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Introduction to Neural Networks

Neural networks generally represent an example of a machine learning model. Neural networks may be organized into layers of interconnected nodes. Generally, a node (or neuron) is where computation happens. For example, a node may combine input data with a set of weights (or coefficients) that either amplifies or dampens the input data. The amplification or dampening of the input signals may thus be considered an assignment of relative significances to various inputs with regard to a task the network is trying to learn. Generally, input-weight products are summed (or accumulated), and then the sum is passed through a node's activation function to determine whether and to what extent that signal should progress further through the network.

In a most basic implementation, a neural network may have an input layer, a hidden layer, and an output layer. "Deep" neural networks generally have more than one hidden layer.

Deep learning is a method of training deep neural networks. Generally, deep learning maps inputs to the network to outputs from the network and is thus sometimes referred to as a "universal approximator" because deep learning can learn to approximate an unknown function $f(x)=y$ between any input x and any output y. In other words, deep learning finds the right $f$ to transform x into y.

More particularly, deep learning trains each layer of nodes based on a distinct set of features, which is the output from the previous layer. Thus, with each successive layer of a deep neural network, features become more complex. As such, deep learning is powerful because it can progressively extract higher-level features from input data and perform complex tasks, such as object recognition, by learning to represent inputs at successively higher levels of abstraction in each layer, thereby building up a useful feature representation of the input data.

For example, if presented with visual data, a first layer of a deep neural network may learn to recognize relatively simple features, such as edges, in the input data. In another example, if presented with auditory data, the first layer of a deep neural network may learn to recognize spectral power in specific frequencies in the input data. The second layer of the deep neural network may then learn to recognize combinations of features, such as simple shapes for visual data or combinations of sounds for auditory data, based on the output of the first layer. Higher layers may then learn to recognize complex shapes in visual data or words in auditory data. Still higher layers may learn to recognize common visual objects or spoken phrases. Thus, deep learning architectures may perform especially well when applied to problems that have a natural hierarchical structure.

In certain aspects, a prediction mechanism of a BS (e.g., BS 102 of FIGS. 1 and 2) may include a machine learning model, such as a neural network, an autoregressive model, or the like, configured to predict a UE-measured strength of a transmit beam used by the BS 102 to transmit a signal to the UE 104. Though certain aspects are discussed with respect to use of a machine learning model, and in particular a neural network, any suitable prediction mechanism may be used. In some examples, the neural network may use historical measurements made by a UE 104 of one or more BS 102 transmit beams, as well as assistance information provided to the BS 102 by the UE 104. In some examples, the BS 102 may store the historical measurements, which may include beam strengths as measured by the UE, one or more identifiers identifying a particular beam corresponding to the measured strength, and a time instance or period (e.g., slot or symbol) associated with the measurement. The historical measurements may be stored, for example, as a table on the BS 102 (e.g., previous measurements of beam strengths represented in two dimensions: time and an identifier of the particular beam measured). Similarly, the BS 102 may receive and store assistance information provided by the UE 104. As such, the historical beam information and the assistance information may be used to train the neural network to predict a strength of one or more future BS transmit beam as they will be received by the UE.

Aspects Related to Beam Prediction

Figure 4:
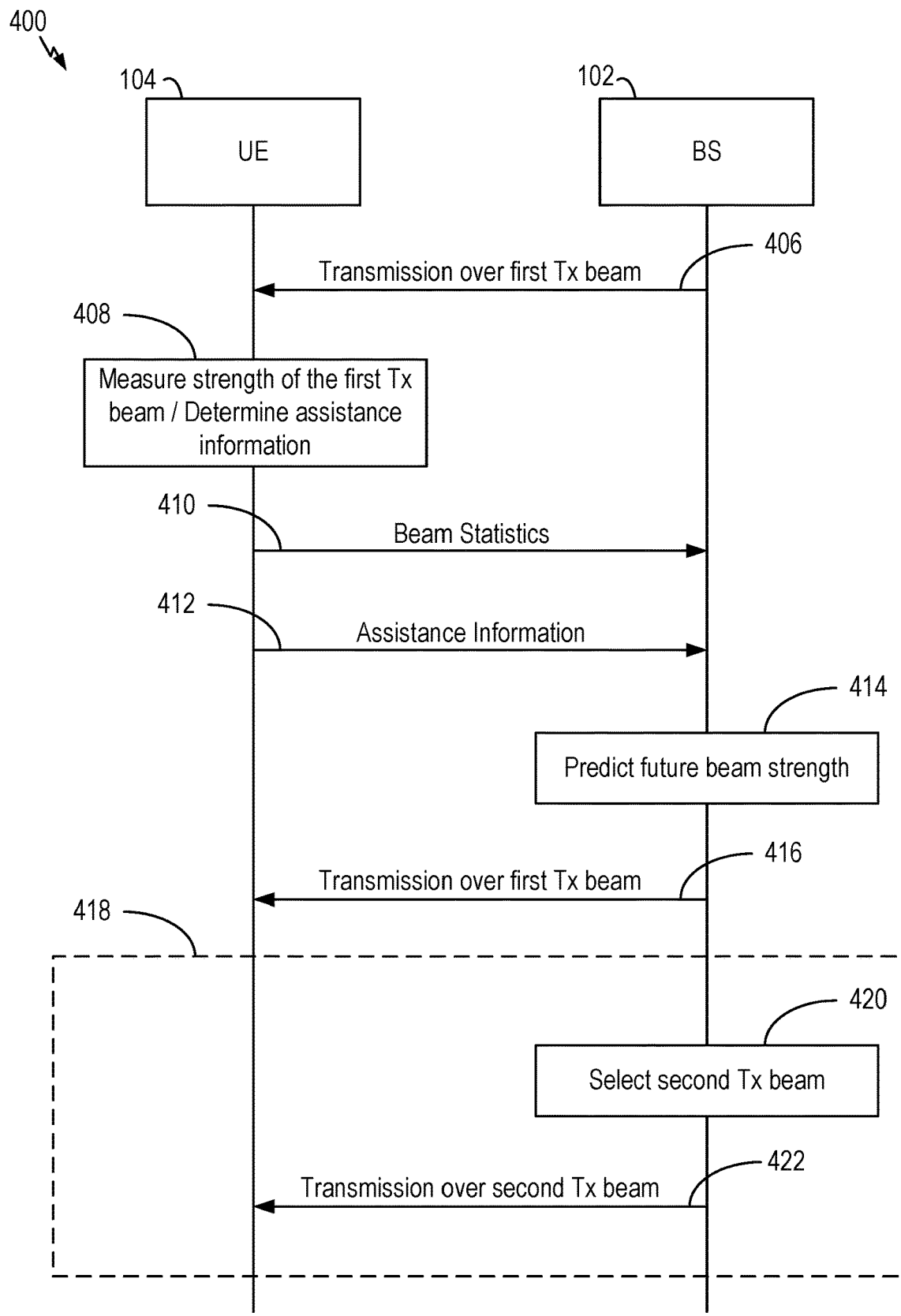
FIG. 4 is a call-flow diagram illustrating example communications between a BS and a UE.

FIG. 4 is a call-flow diagram illustrating example communications between a UE (e.g., UE 104 of FIGS. 1 and 2) and a BS (e.g., BS 102 of FIGS. 1 and 2). In this illustration, time advances in the downward direction, and communication signals between the illustrated entities are denoted with arrows between the lines below the respective entities.

In a first communication 406, the BS 102 may transmit signaling, to the UE 104, over a first transmit beam. The first transmit beam may be one of a plurality of transmit beams used for communication with the UE 104. For instance, the first transmit beam may be one of a plurality of transmit beams used to transmit a synchronization signal block (SSB) for initial beam establishment. In this example, the first communication may be an SSB. In another example, the first transmit beam may be an established serving beam used by the BS 102 for communication with the UE 104.

In a first process 408, the UE 104 may perform one or more of: (i) a strength measurement of one or more transmit beams including the first transmit beam, and/or (ii) determine assistance information relevant for transmit beam strength prediction by the BS 104. For example, the UE 104 may measure the strength of a particular transmit beam and determine one or more of a reference signal received power (RSRP), a signal-to-interference-plus-noise ratio (SINR), a reference signal received quality (RSRQ), and/or any other suitable measurement of power of a transmit beam.

The first process 408 may also be used by the UE 104 to determine assistance information. The assistance information may be determined based at least in part on the first communication 406, and/or based on information independent of the first communication 406. In a first example, the assistance information may include a measure of latency associated with how much time the UE 104 used to determine each of one or more beam strength measurements. For instance, the measure of latency may be an amount or duration of time used by the UE 104 to determine a strength (e.g., RSRP) of the first transmit beam, such as between the time the UE 104 receives the first transmit beam and the time the UE 104 determines the strength. The amount of time may include time used by the UE 104 to process and/or filter signaling received over the first transmit beam. In some examples, the latency may vary based on the type of processing and/or filtering (e.g., infinite impulse response (IIR) filtering) used to process the signaling and measure the first transmit beam. In another example, the measure of latency may include an indication of a window of time (e.g., a slot, frame, etc.) during which the UE 104 determined the strength of one or more transmit beams including the first transmit beam.

In a second example, the assistance information may include an indication, for each of one or more actual beam strengths (e.g., beam strengths as measured by the UE 104), whether a blocking event has occurred at the UE affecting reception of the corresponding transmit beam. In an example, the UE 104 may notify the BS 102 that one or more beams have been subjected to a short-term blocking event, which may affect a strength measurement of the corresponding beam(s). A blocking event may be introduction of an object between the signal path of the UE 104 and the BS 102 that may block or attenuate the signal communicated between the UE 104 and the BS 102. An example of such an object may be, for example, a wall, a tree, a hand on the UE 104, etc. In some examples, the UE 104 may determine that a beam has been blocked based feedback provided by one or more sensors (e.g., camera, ambient light sensor, location sensor, etc.) and/or a rapid change in beam strength. For instance, if a UE 104, based on one or more sensors (e.g., global positioning system (GPS)), determines that the UE 104 has changed its position from outdoors to inside of a building or other structure, and a beam strength of one or more transmits beams including the first transmit beam rapidly declines upon entering the building, then the UE 104 may determine that a blocking event has occurred. In certain aspects, the UE may determine whether the blocking event is a short-term blocking event based on a speed (e.g., a velocity or acceleration) of the UE 104.

The BS 102 may use blocking event information to determine whether a beam strength measurement provided by the UE 104 is reliable for future beam strength prediction. For example, if the UE 104 provides a beam strength measurement to the BS 102 along with a corresponding indication of a short-term blocking event, then the BS 102 may not use or store the beam strength measurement to predict a future beam measurement by the UE 104, as the beam strength measurement may only be temporary and change when the blocking event has ended.

In a third example, the assistance information may include an indication of one or more of a trajectory and/or a speed of the UE 104. In certain aspects, the UE 104 may provide the BS 102 with an indication of a quantized level of direction (e.g., 4 quantized levels (N, S, E, W), 8 quantized levels (N, S, E, W, NE, NW, SE, SW), etc.) and a movement speed along that direction. The BS 102 may use information corresponding to one or more of the trajectory and/or the speed of the UE 104 to aid in predicting a transmit beam strength at the UE 104 of one or more BS-side transmit beams. For example, if the trajectory of the UE 104 indicates it is moving outside of a spatial area served by the transmit beam, the BS 102 may determine predict that the strength will change. How fast the strength changes may be predicted based on the speed of the UE 104.

In a second communication 410, the UE 104 may transmit signaling to the BS 102 indicating beam statistics for one or more of the BS's 104 transmit beams determined at the first process 408, including the first transmit beam of the first communication 406. In certain aspects, the beam statistics may include a strength, as measured by the UE 104, of one or more transmit beams, wherein the strength may be expressed as a maximum decibel per milliwatt (dBm) value. The UE 104 may provide beam statistics to the BS 102 in response to receiving a scheduled downlink transmission, in response to receiving a configurable number of scheduled downlink transmissions, and/or in response to a request by the BS 102 to provide the beam statistics. The BS 102 may store and maintain current and previous beam statistics as historical beam information to aid a prediction mechanism of the BS 102 to predict what the UE 104 may measure as a strength of a future transmit beam.

In a third communication 412, the UE 104 may transmit to the BS 102, the assistance information determined at the first process 408. Though the assistance information is described as being sent in third communication 412, it should be noted that alternatively, the assistance information may also be sent in second communication 410. The UE 104 may provide assistance information to the BS 102 in response to receiving a scheduled downlink transmission, in response to receiving a configurable number of scheduled downlink transmissions, in response to a request by the BS 102 to provide the beam statistics, and/or in response to an event (e.g., a blocking event).

In certain aspects, each of the beam statistics and the assistance information may be transmitted, by the UE 104 to the BS 102, using at least one of radio resource control (RRC) signaling, a medium access control-control element (MAC-CE), or a physical uplink control channel (PUCCH). Although FIG. 4 illustrates the beam statistics and assistance information as corresponding to separate transmissions by the UE 104, both the beam statistics and assistance information may be part of the same transmission.

In a second process 414, the BS 102 may predict what the UE 104 will measure as a beam strength of one or more transmit beams used by the BS 102 in a future transmission (e.g., during a future time period). For example, the BS 102 may predict a transmit beam strength for one or more BS-side transmits beams for a time period subsequent to a current time period, based at least on one or more of the beam statistics and the assistance information. As discussed, the BS 102 may use one or more of the beam statistics and the assistance information as input to a prediction mechanism (e.g., a machine learning model) to predict a transmit beam strength at the UE.

Accordingly, the BS 102 may predict what the UE 104 will measure as a strength of a transmit beam, the transmit beam used by the BS 102 to transmit a signal scheduled for a future time period. In this example, the BS 102 may predict a strength of the first transmit beam, the first transmit beam used to transmit a signal to the UE 104 in a fourth communication 416 scheduled for a future time period.

If, at the second process 414, the BS 102 predicts that the strength of the first transmit beam as received by the UE 104 will be greater than a threshold value (e.g., the BS 102 predicts that the strength of the first transmit beam is sufficient and will not result in a beam failure event), then the BS 102 may proceed to the fourth communication 416 whereby the BS 102 uses the first transmit beam to transmit signaling to the UE 104. In response to the fourth communication 416, the UE 104 may again determine beam statistics for the first transmit beam and/or determine assistance information the aid the BS 102.

However, if, at the second process 414, the BS 102 predicts that the strength of the first transmit beam as received by the UE 104 will be less than the threshold value (e.g., the BS 102 predicts that the strength of the first transmit beam will be too low when it is received by the UE 104), then, in certain aspects, the BS 102 may skip the fourth communication 416 and instead proceed to a new beam procedure 418. In the new beam procedure 418, the BS 102 may perform a third process 420 to select a second transmit beam to use instead of the first transmit beam to transmit signaling to the UE 104. The BS 102 may select the second transmit beam after predicting that a strength of the second transmit beam as received by the UE 104 will be greater than the threshold value. Once the second transmit beam has been selected, the BS 102 may perform a fifth communication 422 whereby the BS 102 uses the second transmit beam to communicate signaling to the UE 104.

FIG. 5 is a flow diagram illustrating example operations 500 for wireless communication, in accordance with certain aspects of the present disclosure. The operations 500 may be performed, for example, by a BS (e.g., such as the BS 102 in FIGS. 1 and 2). The operations 500 may be complementary to the operations 600 performed by the UE and described below in reference to FIG. 6. The operations 500 may be implemented as software components that are executed and run on one or more processors (e.g., controller/processor 240 of FIG. 2). Further, the transmission and reception of signals by the BS in operations 500 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 500 may begin, at a first block 510, by receiving, from the UE, one or more indications of one or more actual beam strengths as measured at the UE at one or more time periods for one or more transmit beams of the BS.

The operations 500 may proceed to a second block 520, by receiving, from the UE, assistance information regarding the one or more actual beam strengths.

In some examples, the operations 500 may proceed to a third block 530, by determining a predicted beam strength for at least one transmit beam of the BS for a time period subsequent to the one or more time periods based at least on the one or more indications and the assistance information.

In certain aspects, the assistance information indicates a measure of latency for each of the one or more actual beam strengths.

In certain aspects, for each of the one or more actual beam strengths, the measure of latency is based on at least one of a time period over which the actual beam strength is measured at the UE, a filtering applied to measure the actual beam strength at the UE, or a window used to measure the actual beam strength at the UE.

In certain aspects, the assistance information indicates, for each of the one or more actual beam strengths, whether a blocking event has occurred at the UE affecting reception of the corresponding transmit beam.

In certain aspects, the assistance information indicates trajectory of the UE.

In certain aspects, the assistance information further indicates a speed of the UE.

In certain aspects, the predicted beam strength is determined using a machine learning model.

In certain aspects, the assistance information is received via at least one of radio resource control (RRC) signaling, a medium access control-control element (MAC-CE), or a physical uplink control channel (PUCCH).

In certain aspects, actual beam strength comprises actual reference signal received power (RSRP).

FIG. 6 is a flow diagram illustrating example operations 600 for wireless communication, in accordance with certain aspects of the present disclosure. The operations 600 may be performed, for example, by a UE (e.g., such as the UE 104 in FIGS. 1 and 2). The operations 600 may be complementary to the operations 500 performed by the BS. The operations 600 may be implemented as software components that are executed and run on one or more processors (e.g., controller/processor 280 of FIG. 2). Further, the transmission and reception of signals by the UE in operations 600 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 600 may begin, at a first block 610, by transmitting, to the BS, one or more indications of one or more actual beam strengths as measured at the UE at one or more time periods for one or more transmit beams of the BS.

The operations 600 may proceed, at a second block 620 by transmitting, to the BS, assistance information regarding the one or more actual beam strengths.

In certain aspects, the assistance information indicates a measure of latency for each of the one or more actual beam strengths.

In certain aspects, for each of the one or more actual beam strengths, the measure of latency is based on at least one of a time period over which the actual beam strength is measured at the UE, a filtering applied to measure the actual beam strength at the UE, or a window used to measure the actual beam strength at the UE.

In certain aspects, the assistance information indicates, for each of the one or more actual beam strengths, whether a blocking event has occurred at the UE affecting reception of a corresponding transmit beam.

In certain aspects, the assistance information indicates trajectory of the UE.

In certain aspects, the assistance information further indicates a speed of the UE.

In certain aspects, the assistance information is transmitted via at least one of radio resource control (RRC) signaling, a medium access control-control element (MAC-CE), or a physical uplink control channel (PUCCH).

In certain aspects, actual beam strength comprises actual reference signal received power (RSRP).

Example Wireless Communication Devices

Figure 7:
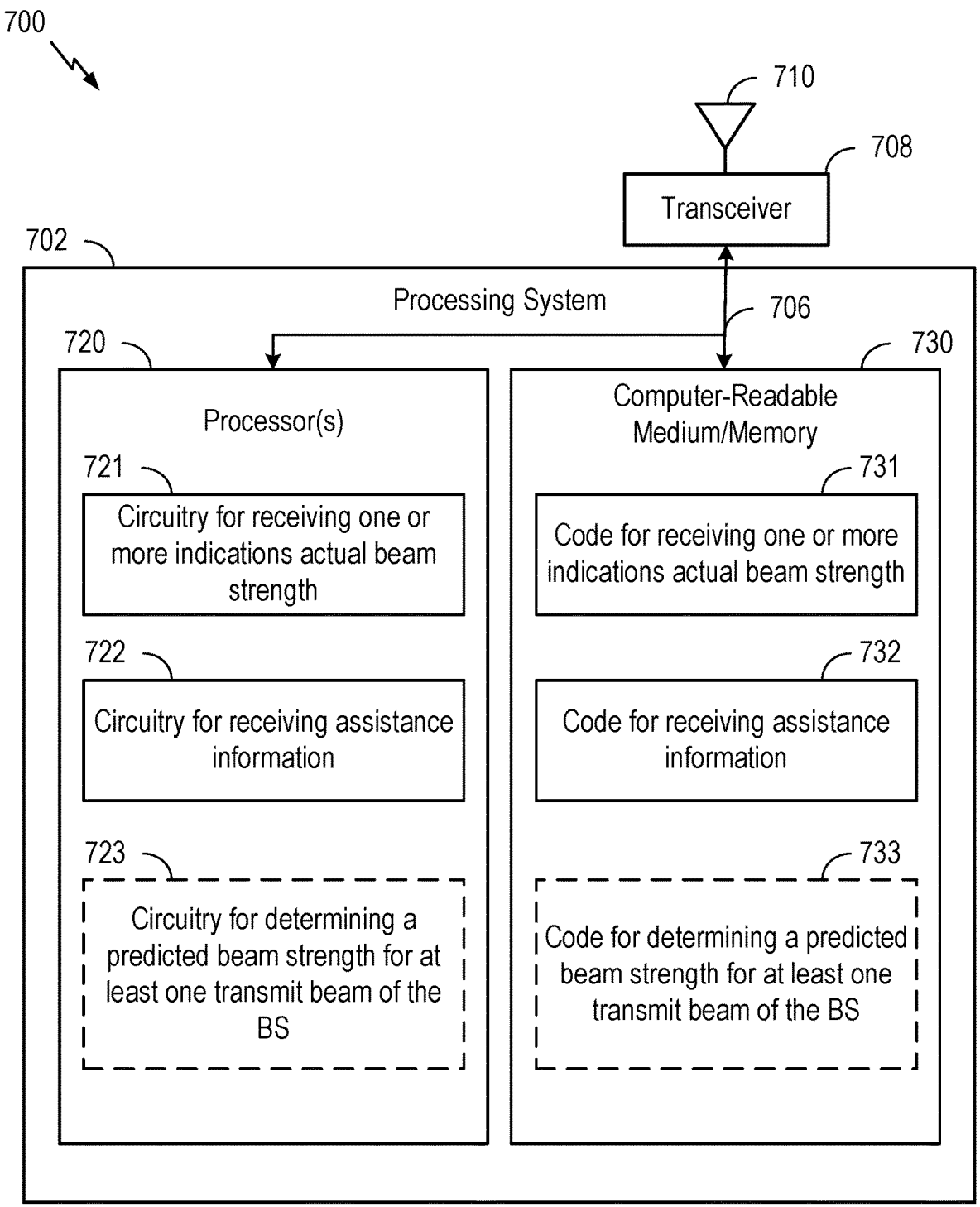
FIG. 7 is a block diagram illustrating example aspects of an example communications device.

FIG. 7 is a block diagram illustrating an example communications device 700 that includes various components operable, configured, or adapted to perform operations for the techniques disclosed herein, such as the operations depicted and described with respect to FIG. 5. In some examples, communication device 700 may be a base station 102 as described, for example with respect to FIGS. 1 and 2.

Communications device 700 includes a processing system 702 coupled to a transceiver 708 (e.g., a transmitter and/or a receiver). Transceiver 708 is configured to transmit (or send) and receive signals for the communications device 700 via an antenna 710, such as the various signals as described herein. Processing system 702 may be configured to perform processing functions for communications device 700, including processing signals received and/or to be transmitted by communications device 700.

Processing system 702 includes one or more processors 720 coupled to a computer-readable certain medium/memory 730 via a bus 706. In aspects, computer-readable medium/memory 730 is configured to store instructions (e.g., computer-executable code) that when executed by the one or more processors 720, cause the one or more processors 720 to perform the operations illustrated in FIG. 5, or other operations for performing the various techniques discussed herein for predicting a strength of a transmit beam as measured at a UE.

In the depicted example, computer-readable medium/memory 730 stores code 731 for receiving, from a UE, one or more indications of one or more actual beam strengths as measured at the UE at one or more time periods for one or more transmit beams of the BS; code 732 for receiving, from the UE, assistance information regarding the one or more actual beam strengths; and code 733 for determining a predicted beam strength for at least one transmit beam of the BS for a time period subsequent to the one or more time periods based at least on the one or more indications and the assistance information.

In the illustrated example, the one or more processors 720 include circuitry configured to implement the code stored in the computer-readable medium/memory 730, including circuitry 721 for receiving, from a UE, one or more indications of one or more actual beam strengths as measured at the UE at one or more time periods for one or more transmit beams of the BS; circuitry 722 for receiving, from the UE, assistance information regarding the one or more actual beam strengths; and circuitry 723 for determining a predicted beam strength for at least one transmit beam of the BS for a time period subsequent to the one or more time periods based at least on the one or more indications and the assistance information.

Various components of communications device 700 may provide means for performing the methods described herein, including with respect to FIG. 5.

In some examples, means for transmitting or sending (or means for outputting for transmission) may include the transceivers 232 and/or antenna(s) 234 of the base station 102 illustrated in FIG. 2 and/or transceiver 708 and antenna 710 of the communication device 700 in FIG. 7.

In some examples, means for receiving (or means for obtaining) may include the transceivers 232 and/or antenna(s) 234 of the base station illustrated in FIG. 2 and/or transceiver 708 and antenna 710 of the communication device 700 in FIG. 7. Means for receiving may also include circuitry 721 for receiving, from a UE, one or more indications of one or more actual beam strengths as measured at the UE at one or more time periods for one or more transmit beams of the BS; and circuitry 722 for receiving, from the UE, assistance information regarding the one or more actual beam strengths.

In some examples, means for determining a predicted beam strength for at least one transmit beam of the BS for a time period subsequent to the one or more time periods based at least on the one or more indications and the assistance information may include various processing system components, such as: the one or more processors 720 in FIG. 7, or aspects of the base station 102 depicted in FIG. 2, including receive processor 238, transmit processor 220, TX MIMO processor 230, controller/processor 240 (including beam prediction component 199), and/or circuitry 723 for determining a predicted beam strength for at least one transmit beam of the BS for a time period subsequent to the one or more time periods based at least on the one or more indications and the assistance information.

Notably, FIG. 7 is an example, and many other examples and configurations of communication device 700 are possible.

Figure 8:
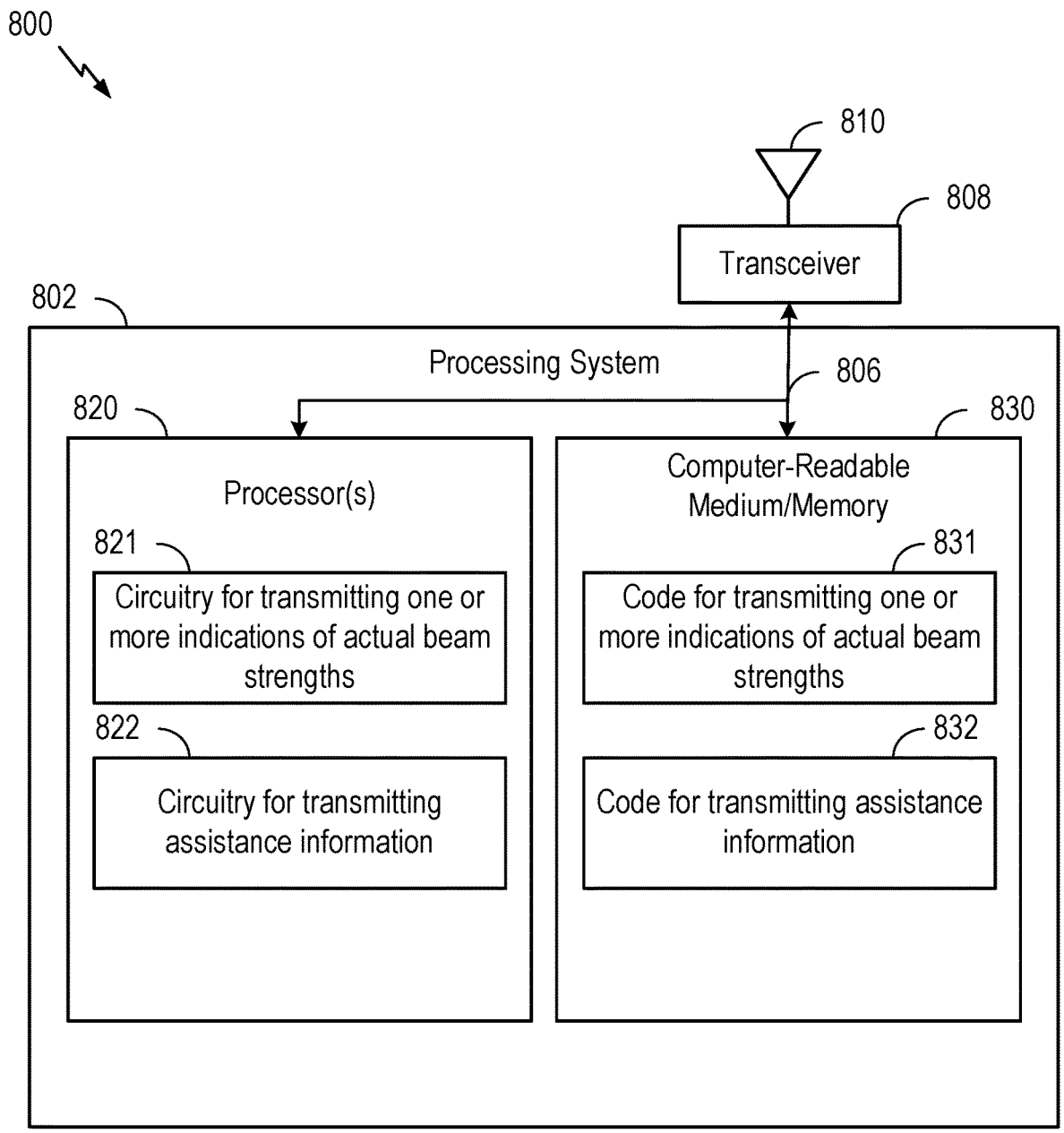
FIG. 8 is a block diagram illustrating example aspects of an example communications device.

FIG. 8 is a block diagram illustrating an example communications device 800 that includes various components operable, configured, or adapted to perform operations for the techniques disclosed herein, such as the operations depicted and described with respect to FIG. 6. In some examples, communication device 800 may be a user equipment (UE) 104 as described, for example with respect to FIGS. 1 and 2.

Communications device 800 includes a processing system 802 coupled to a transceiver 808 (e.g., a transmitter and/or a receiver). Transceiver 808 is configured to transmit (or send) and receive signals for the communications device 800 via an antenna 810, such as the various signals as described herein. Processing system 802 may be configured to perform processing functions for communications device 800, including processing signals received and/or to be transmitted by communications device 800.

Processing system 802 includes one or more processors 820 coupled to a computer-readable medium/memory 830 via a bus 806. In certain aspects, computer-readable medium/memory 830 is configured to store instructions (e.g., computer-executable code) that when executed by the one or more processors 820, cause the one or more processors 820 to perform the operations illustrated in FIG. 6, or other operations for performing the various techniques discussed herein for supporting BS strength prediction of transmit beams.

In the depicted example, computer-readable medium/memory 830 stores code 831 for transmitting, to a base station (BS), one or more indications of one or more actual beam strengths as measured at the UE at one or more time periods for one or more transmit beams of the BS; and code 832 for transmitting, to the BS, assistance information regarding the one or more actual beam strengths.

In the depicted example, the one or more processors 820 include circuitry configured to implement the code stored in the computer-readable medium/memory 830, including circuitry 821 for transmitting, to a base station (BS), one or more indications of one or more actual beam strengths as measured at the UE at one or more time periods for one or more transmit beams of the BS; and circuitry 822 for transmitting, to the BS, assistance information regarding the one or more actual beam strengths.

Various components of communications device 800 may provide means for performing the methods described herein, including with respect to FIG. 6.

In some examples, means for transmitting or sending (or means for outputting for transmission) may include the transceivers 254 and/or antenna(s) 252 of the user equipment 104 illustrated in FIG. 2, transceiver 808 and antenna 810 of the communication device 800 in FIG. 8, circuitry 821 for transmitting, to a base station (BS), one or more indications of one or more actual beam strengths as measured at the UE at one or more time periods for one or more transmit beams of the BS, and/or and circuitry 822 for transmitting, to the BS, assistance information regarding the one or more actual beam strengths.

In some examples, means for receiving (or means for obtaining) may include the transceivers 254 and/or antenna(s) 252 of the user equipment 104 illustrated in FIG. 2 and/or transceiver 808 and antenna 810 of the communication device 800 in FIG. 8.

Notably, FIG. 8 is an example, and many other examples and configurations of communication device 800 are possible.

EXAMPLE CLAUSES

Implementation examples are described in the following numbered clauses:

Clause 1. A user equipment (UE), comprising: a memory; and a processor coupled to the memory, the memory and the processor being configured to: transmit, to a base station (BS), one or more indications of one or more actual beam strengths as measured by the UE at one or more time periods for one or more transmit beams of the BS; and transmit, to the BS, assistance information regarding the one or more actual beam strengths.

Clause 2. The UE of clause 1, wherein the assistance information indicates a measure of latency for each of the one or more actual beam strengths.

Clause 3. The UE of any of clauses 1 and 2, wherein, for each of the one or more actual beam strengths, the measure of latency is based on at least one of a time period over which the actual beam strength is measured at the UE, a filtering applied to measure the actual beam strength at the UE, or a window used to measure the actual beam strength at the UE.

Clause 4. The UE of any of clauses 1-3, wherein the assistance information indicates, for each of the one or more actual beam strengths, whether a blocking event has occurred at the UE affecting reception of the corresponding transmit beam.

Clause 5. The UE of any of clauses 1-4, wherein the assistance information indicates trajectory of the UE.

Clause 6. The UE of any of clauses 1-5, wherein the assistance information further indicates a speed of the UE.

Clause 7. The UE of any of clauses 1-6, wherein the assistance information is transmitted via at least one of radio resource control (RRC) signaling, a medium access control-control element (MAC-CE), or a physical uplink control channel (PUCCH).

Clause 8. The UE of any of clauses 1-7, wherein actual beam strength comprises actual reference signal received power (RSRP).

Clause 9. A base station (BS), comprising: a memory; and a processor coupled to the memory, the memory and the processor being configured to: receive, from a user equipment (UE), one or more indications of one or more actual beam strengths as measured at the UE at one or more time periods for one or more transmit beams of the BS; and receive, from the UE, assistance information regarding the one or more actual beam strengths.

Clause 10. The BS of clause 9, wherein the assistance information indicates a measure of latency for each of the one or more actual beam strengths.

Clause 11. The BS of any of clauses 9 and 10, wherein, for each of the one or more actual beam strengths, the measure of latency is based on at least one of a time period over which the actual beam strength is measured at the UE, a filtering applied to measure the actual beam strength at the UE, or a window used to measure the actual beam strength at the UE.

Clause 12. The BS of any of clauses 9-11, wherein the assistance information indicates, for each of the one or more actual beam strengths, whether a blocking event has occurred at the UE affecting reception of the corresponding transmit beam.

Clause 13. The BS of any of clauses 9-12, wherein the assistance information indicates trajectory of the UE.

Clause 14. The BS of any of clauses 9-13, wherein the assistance information further indicates a speed of the UE.

Clause 15. The BS of any of clauses 9-14, wherein the processor and the memory are further configured to: determine a predicted beam strength for at least one transmit beam of the BS for a time period subsequent to the one or more time periods based at least on the one or more indications and the assistance information.

Clause 16. The BS of any of clauses 9-15, wherein the predicted beam strength is determined using a machine learning model.

Clause 17. The BS of any of clauses 9-16, wherein the assistance information is received via at least one of radio resource control (RRC) signaling, a medium access control-control element (MAC-CE), or a physical uplink control channel (PUCCH).

Clause 18. The BS of any of clauses 9-17, wherein actual beam strength comprises actual reference signal received power (RSRP).

Clause 19. A method of wireless communication by a user equipment (UE), the method comprising: transmitting, to a base station (BS), one or more indications of one or more actual beam strengths as measured by the UE at one or more time periods for one or more transmit beams of the BS; and transmitting, to the BS, assistance information regarding the one or more actual beam strengths.

Clause 20. The method of clause 19, wherein the assistance information indicates a measure of latency for each of the one or more actual beam strengths.

Clause 21. The method of any of clauses 19 and 20, wherein, for each of the one or more actual beam strengths, the measure of latency is based on at least one of a time period over which the actual beam strength is measured at the UE, a filtering applied to measure the actual beam strength at the UE, or a window used to measure the actual beam strength at the UE.

Clause 22. The method of any of clauses 19-21, wherein the assistance information indicates, for each of the one or more actual beam strengths, whether a blocking event has occurred at the UE affecting reception of a corresponding transmit beam.

Clause 23. The method of any of clauses 19-22, wherein the assistance information indicates trajectory of the UE.

Clause 24. The method of any of clauses 19-23, wherein the assistance information further indicates a speed of the UE.

Clause 25. The method of any of clauses 19-24, wherein the assistance information is transmitted via at least one of radio resource control (RRC) signaling, a medium access control-control element (MAC-CE), or a physical uplink control channel (PUCCH).

Clause 26. The method of any of clauses 19-25, wherein actual beam strength comprises actual reference signal received power (RSRP).

Clause 27. A non-transitory computer-readable medium having instructions stored thereon that, when executed by a user equipment (UE), cause the UE to perform operations comprising: transmitting, to a base station (BS), one or more indications of one or more actual beam strengths as measured by the UE at one or more time periods for one or more transmit beams of the BS; and transmitting, to the BS, assistance information regarding the one or more actual beam strengths.

Clause 28. The non-transitory computer-readable medium of clause 27, wherein the assistance information indicates a measure of latency for each of the one or more actual beam strengths.

Clause 29. The non-transitory computer-readable medium of any of clauses 27 and 28, wherein, for each of the one or more actual beam strengths, the measure of latency is based on at least one of a time period over which the actual beam strength is measured at the UE, a filtering applied to measure the actual beam strength at the UE, or a window used to measure the actual beam strength at the UE.

Clause 30. The non-transitory computer-readable medium of any of clauses 27-29, wherein the assistance information indicates, for each of the one or more actual beam strengths, whether a blocking event has occurred at the UE affecting reception of a corresponding transmit beam.

Clause 31. A method of wireless communication by a base station (BS), the method comprising: receiving, from a user equipment (UE), one or more indications of one or more actual beam strengths as measured at the UE at one or more time periods for one or more transmit beams of the BS; and receiving, from the UE, assistance information regarding the one or more actual beam strengths.

Clause 32. The method of clause 31, wherein the assistance information indicates a measure of latency for each of the one or more actual beam strengths.

Clause 33. The method of any of clauses 31 and 32, wherein, for each of the one or more actual beam strengths, the measure of latency is based on at least one of a time period over which the actual beam strength is measured at the UE, a filtering applied to measure the actual beam strength at the UE, or a window used to measure the actual beam strength at the UE.

Clause 34. The method of any of clauses 31-33, wherein the assistance information indicates, for each of the one or more actual beam strengths, whether a blocking event has occurred at the UE affecting reception of the corresponding transmit beam.

Clause 35. The method of any of clauses 31-34, wherein the assistance information indicates trajectory of the UE.

Clause 36. The method of any of clauses 31-35, wherein the assistance information further indicates a speed of the UE.

Clause 37. The BS method any of clauses 31-36, further comprising determining a predicted beam strength for at least one transmit beam of the BS for a time period subsequent to the one or more time periods based at least on the one or more indications and the assistance information.

Clause 38. The method of any of clauses 31-37, wherein the predicted beam strength is determined using a machine learning model.

Clause 39. The method of any of clauses 31-38, wherein the assistance information is received via at least one of radio resource control (RRC) signaling, a medium access control-control element (MAC-CE), or a physical uplink control channel (PUCCH).

Clause 40. The method of any of clauses 31-39, wherein actual beam strength comprises actual reference signal received power (RSRP).

Clause 41: An apparatus, comprising means for performing a method in accordance with any one of Clauses 19-26.

Clause 42: An apparatus, comprising means for performing a method in accordance with any one of Clauses 31-40.

Clause 43: A non-transitory computer-readable medium comprising executable instructions that, when executed by one or more processors of an apparatus, cause the apparatus to perform a method in accordance with any one of Clauses 31-40.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). Base stations 102 configured for 5G (e.g., 5G NR or Next Generation RAN (NG-RAN)) may interface with 5GC 190 through second backhaul links 184. Base stations 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180 may operate in a traditional sub-6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave base station.

The communication links 120 between base stations 102 and, for example, UEs 104, may be through one or more carriers. For example, base stations 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications system 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^\mu \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A-3D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of predicting, by a base station, transmit beam strength as measured at a user equipment, in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module.

Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A user equipment (UE), comprising:
    a memory comprising instructions; and
    one or more processors configured to execute the instructions and cause the UE to:
        transmit, to a base station (BS), one or more indications of one or more actual beam strengths as measured by the UE at one or more time periods for one or more transmit beams of the BS; and
        transmit, to the BS, assistance information regarding the one or more actual beam strengths, wherein the assistance information indicates a measure of latency for at least one of the one or more actual beam strengths, and wherein the measure of latency corresponds to an amount of time used by the UE to determine the one or more actual beam strengths.

2. The UE of claim 1, wherein the assistance information indicates the measure of latency for each of the one or more actual beam strengths.

3. The UE of claim 2, wherein, for each of the one or more actual beam strengths, the measure of latency is based on at least one of the amount of time over which the actual beam strength is measured at the UE, a filtering applied to measure the actual beam strength at the UE, or a window used to measure the actual beam strength at the UE.

4. The UE of claim 1, wherein the assistance information indicates, for each of the one or more actual beam strengths, whether a blocking event has occurred at the UE affecting reception of the corresponding transmit beam.

5. The UE of claim 1, wherein the assistance information indicates trajectory of the UE.

6. The UE of claim 5, wherein the assistance information further indicates a speed of the UE.

7. The UE of claim 1, wherein the assistance information is transmitted via at least one of radio resource control (RRC) signaling, a medium access control-control element (MAC-CE), or a physical uplink control channel (PUCCH).

8. The UE of claim 1, wherein actual beam strength comprises actual reference signal received power (RSRP).

9. A base station (BS), comprising:
    a memory comprising instructions; and
    one or more processors configured to execute the instructions and cause the BS to:
        receive, from a user equipment (UE), one or more indications of one or more actual beam strengths as measured at the UE at one or more time periods for one or more transmit beams of the BS; and
        receive, from the UE, assistance information regarding the one or more actual beam strengths, wherein the assistance information indicates a measure of latency for at least one of the one or more actual beam strengths, and wherein the measure of latency corresponds to an amount of time used by the UE to determine the one or more actual beam strengths.

10. The BS of claim 9, wherein the assistance information indicates the measure of latency for each of the one or more actual beam strengths.

11. The BS of claim 10, wherein, for each of the one or more actual beam strengths, the measure of latency is based on at least one of the amount of time over which the actual beam strength is measured at the UE, a filtering applied to measure the actual beam strength at the UE, or a window used to measure the actual beam strength at the UE.

12. The BS of claim 9, wherein the assistance information indicates, for each of the one or more actual beam strengths, whether a blocking event has occurred at the UE affecting reception of the corresponding transmit beam.

13. The BS of claim 9, wherein the assistance information indicates trajectory of the UE.

14. The BS of claim 13, wherein the assistance information further indicates a speed of the UE.

15. The BS of claim 9, wherein the one or more processors are configured to execute the instructions and cause the BS to:
  determine a predicted beam strength for at least one transmit beam of the BS for a time period subsequent to the one or more time periods based at least on the one or more indications and the assistance information.

16. The BS of claim 15, wherein the predicted beam strength is determined using a machine learning model.

17. The BS of claim 9, wherein the assistance information is received via at least one of radio resource control (RRC) signaling, a medium access control-control element (MAC-CE), or a physical uplink control channel (PUCCH).

18. The BS of claim 9, wherein actual beam strength comprises actual reference signal received power (RSRP).

19. A method of wireless communication by a user equipment (UE), the method comprising:
  transmitting, to a base station (BS), one or more indications of one or more actual beam strengths as measured by the UE at one or more time periods for one or more transmit beams of the BS; and
  transmitting, to the BS, assistance information regarding the one or more actual beam strengths, wherein the assistance information indicates a measure of latency for at least one of the one or more actual beam strengths, and wherein the measure of latency corresponds to an amount of time used by the UE to determine the one or more actual beam strengths.

20. The method of claim 19, wherein the assistance information indicates the measure of latency for each of the one or more actual beam strengths.

21. The method of claim 20, wherein, for each of the one or more actual beam strengths, the measure of latency is based on at least one of the amount of time over which the actual beam strength is measured at the UE, a filtering applied to measure the actual beam strength at the UE, or a window used to measure the actual beam strength at the UE.

22. The method of claim 19, wherein the assistance information indicates, for each of the one or more actual beam strengths, whether a blocking event has occurred at the UE affecting reception of a corresponding transmit beam.

23. The method of claim 19, wherein the assistance information indicates trajectory of the UE.

24. The method of claim 23, wherein the assistance information further indicates a speed of the UE.

25. The method of claim 19, wherein the assistance information is transmitted via at least one of radio resource control (RRC) signaling, a medium access control-control element (MAC-CE), or a physical uplink control channel (PUCCH).

26. The method of claim 19, wherein actual beam strength comprises actual reference signal received power (RSRP).

27. A method of wireless communication by a base station (BS) comprising:
  receiving, from a user equipment (UE), one or more indications of one or more actual beam strengths as measured by the UE at one or more time periods for one or more transmit beams of the BS; and
  receiving, from the UE, assistance information regarding the one or more actual beam strengths, wherein the assistance information indicates a measure of latency for at least one of the one or more actual beam strengths, and wherein the measure of latency corresponds to an amount of time used by the UE to determine the one or more actual beam strengths.

28. The method of claim 27, wherein the assistance information indicates the measure of latency for each of the one or more actual beam strengths.

29. The method of claim 28, wherein, for each of the one or more actual beam strengths, the measure of latency is based on at least one of the amount of time over which the actual beam strength is measured at the UE, a filtering applied to measure the actual beam strength at the UE, or a window used to measure the actual beam strength at the UE.

30. The method of claim 27, wherein the assistance information indicates, for each of the one or more actual beam strengths, whether a blocking event has occurred at the UE affecting reception of a corresponding transmit beam.

* * * * *